United States Patent [19]

Kim

[11] Patent Number: 5,327,244
[45] Date of Patent: Jul. 5, 1994

[54] STROBE TIMING CONTROL CIRCUIT FOR USE IN VIDEO TAPE RECORDER

[75] Inventor: Yong-Je Kim, Jinhae-city, Rep. of Korea

[73] Assignee: SamSung Electronics Co., Ltd., Kyungki-do, Rep. of Korea

[21] Appl. No.: 789,794

[22] Filed: Nov. 12, 1991

Related U.S. Application Data

[63] Continuation of Ser. No. 711,374, Jun. 5, 1991, abandoned, which is a continuation of Ser. No. 269,305, Nov. 10, 1988, abandoned.

[30] Foreign Application Priority Data

Nov. 10, 1987 [KR] Rep. of Korea .............. 12646/1987

[51] Int. Cl.$^5$ ........................................ H04N 5/272
[52] U.S. Cl. ................................. 348/594; 348/551
[58] Field of Search ................. 358/22, 183, 181, 185, 358/148, 150

[56] References Cited

U.S. PATENT DOCUMENTS

| | | | |
|---|---|---|---|
| 4,774,582 | 9/1988 | Hakamada | 358/183 |
| 4,814,884 | 3/1989 | Johnson | 358/183 |
| 4,845,564 | 7/1989 | Hakamada | 358/183 |

Primary Examiner—Tommy P. Chin
Attorney, Agent, or Firm—Robert E. Bushnell

[57] ABSTRACT

A circuit for varying the strobe timing of the PIP in a VTR which includes a microcomputer, first, second and third counters receiving the signal for varying the strobe timing of the microcomputer, a modulo-4 counter and logic receiving the output of the first counter, a decoder receiving the outputs of the second and third counters, a multiplexer receiving the output of the decoder, the output of the decoder being applied to the clear terminal of the second counter, a register receiving the output of the multiplexer, and a memory connected with the register. The vertical synchronizing pulse of the sub-screens is applied to the clock terminals of the first and second counters and the clock terminal of the register. The output of the microcomputer is applied to the clock terminal of the third counter.

22 Claims, 2 Drawing Sheets

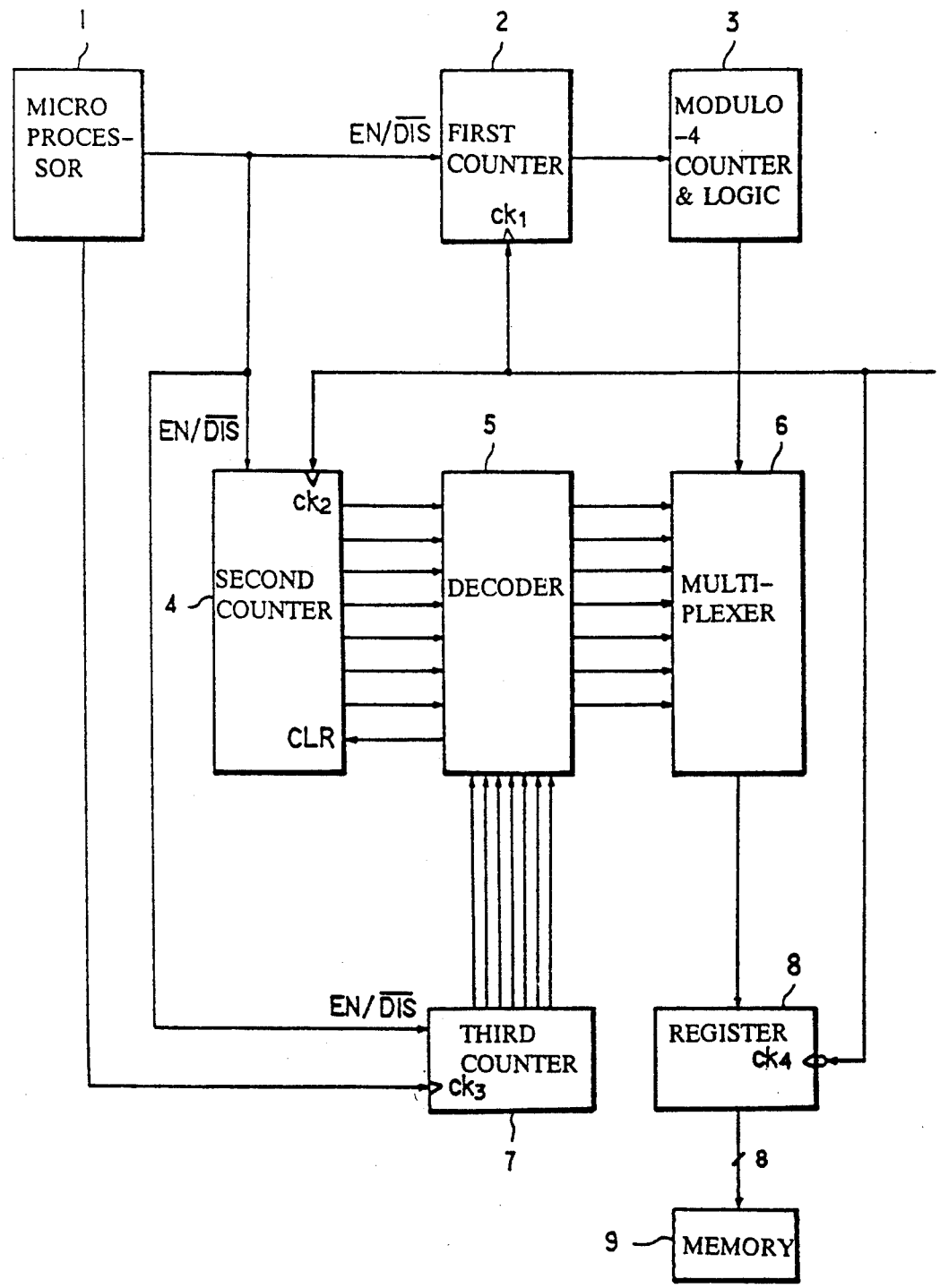
F I G . 1

STROBE TIMING CONTROL CIRCUIT FOR USE IN VIDEO TAPE RECORDER

This is a continuation of application Ser. No. 07/711,374 filed on Jun. 5, 1991 now abandoned, which is a continuation of application Ser. No. 07/269,305 filed on Nov. 10, 1988 now abandoned.

BACKGROUND OF THE INVENTION

The present invention relates to a strobe timing control circuit for use in a video tape recorder (VTR) having the picture-in-picture (PIP) feature therein.

According to a conventional PIP feature in a VTR system, a single screen in the VTR system is divided into two independent parts on display, that is, a main screen display area (hereinafter referred to as "mainscreen") and a plurality of PIP display areas (hereinafter referred to as "sub-screen") which are displayed independently of each other. However, the VTR of prior art has a problem that its user can not vary the strobe timing at a desired time because the strobe timing for the sub-screen therein has been made in the fixed setting.

SUMMARY OF THE INVENTION

The present invention is directed to a circuit for controlling the strobe timing of the PIP operation in a VTR which enables the user to choose a desired strobe timing by increasing or decreasing the strobe timing through a plurality of selection steps therefor.

In accordance with the present invention, the circuit for controlling the strobe timing of the PIP in a VTR includes a microcomputer, first, second and third counters receiving the signal for varying the strobe timing of said microcomputer, a modulo-4 counter and logic receiving the output of said first counter, a decoder receiving the outputs of said second and third counters, a multiplexer receiving the output of said decoder, the output of said decoder being applied to the clear terminal of said second counter, a register receiving the output of said multiplexer, and a memory connected with said register, the vertical synchronizing pulse of the sub-screen being applied to the clock terminals of said first and second counters and the clock terminal of said register, the output of said microcomputer being applied to the clock terminal of said third counter.

BRIEF DESCRIPTION OF THE DRAWINGS

FIG. 1 is an electrical schematic circuit diagram of the present invention;

DETAILED DESCRIPTION OF THE INVENTION

Figure 2:
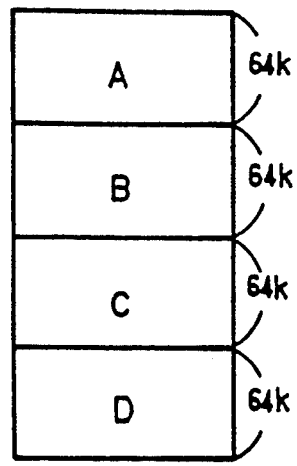
FIG. 2 shows a scheme of a memory bank according to the invention.

The present invention will now be described specifically with reference to the drawings attached only by way of example.

Referring to FIG. 1, the signal for varying the strobe timing of microcomputer 1 is applied to first, second and third counters 2, 4 and 7 so as to disable a first counter 2 and enable second and third counters 4 and 7. The clock terminal CK3 of the third counter 7 receives the output of a microcomputer 1, while the vertical synchronizing pulse of the sub-screen is applied to the clock terminals CK1, CK2 of the first and second counters and the clock terminal CK4 of a register 8. Further, the output of the first counter 2 is applied to a multiplexer 6 through a modulo-4 counter and logic 3, while the outputs of the second and third counters 4 and 7 are applied to a multiplexer 6 through a decoder 5. The output of the decoder 5 is applied to the clear terminal CLR of the second counter 4. Finally, the output of the multiplexer 6 is applied to the memory 9 through the register 8.

The operation in the variation of the strobe timing according to the present invention is accomplished as follows. According to the circuit for varying the strobe timing of the present invention as shown in FIG. 1, when the strobe timing is varied in order to display four sub-screens on a VTR or TV screen, the strobe timing is divided into seven steps both toward the increasing direction and the decreasing, direction, respectively, each of which is set by the user's selection as desired.

First, considering the case that the sub-screens are strobed at a fixed interval, when the four sub-screens are on, there is given a default strobe timing strobed at a fixed interval. First, counter 2 counts the vertical synchronizing pulses of the sub-screens applied to its clock terminal CK1, producing at a fixed time interval pulses of "H" level to modulo-4 counter and logic 3. Modulo-4 counter and logic 3 selects a proper value to charge the positions of the moving sub-screens and produce the output to multiplexer 6. Multiplexer 6 transforms into the desired address of memory 9, the value selected by the modulo-4 counter and logic 3, and stores it in register 8. Register 8 transfers to memory 9, the address value stored by synchronizing with the falling edge of the vertical synchronizing pulse of the sub-screens.

Figure 3:
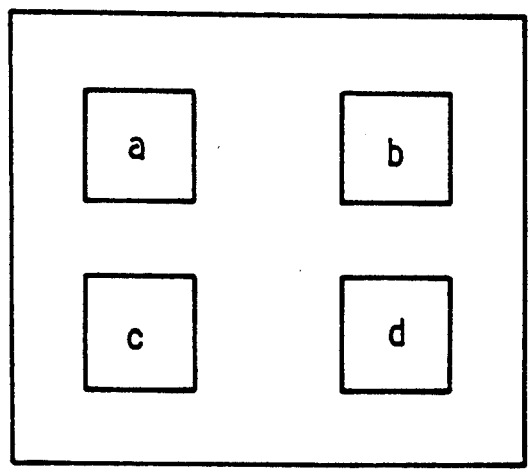
FIG. 3 schematically shows the displaying positions in the sub-screen.

Referring to FIGS. 2 and 3, the data displayed in the position a of FIG. 3 are stored in or read out from the memory bank A of FIG. 2, the data displayed in the position b the bank B, and the data displayed in the positions c and d, respectively the memory bank C and D. Hence, the strobe sequentially makes the frame phases causes position a to move and the positions b,c and d to remain still, the position b move and the remaining positions or c and d remain still, the position c move and the remaining positions a, b and c remain still, and the position d move and the remaining positions a, b and c remain still. Namely, the frame phase moves sequentially and repeatedly at a fixed time interval in the order of position a→position b→position c→position d→position a.

However, if the strobe timing is varied, microcomputer 1 generates the signal for varying the strobe timing, so that the first counter 2 is disabled, and the second and third counters 4 and 7 are enabled to operate. Counter 7 is an up/down counter, which up-counts the signal of the strobe timing increasing received and applies to decoder 5 one of the seven step signals.

Counter 4 counts the vertical synchronizing pulses of the sub-screens, thereby applying the output thereof to decoder 5, which decodes the inputs of the second and third counters 4 and 7, and applies the desired value of the seven steps to multiplexer 6. Multiplexer 6 receives the output of decoder 5, selecting an address of memory banks A to D and applying it to register 8. Register 8 applies to memory 9, the address of the memory banks A to D selected at the falling edge of the vertical synchronizing pulse of the sub-screens by multiplexer 6, accessing the desired bank so as to store the data into memory 9. Accordingly, the sub-screen pertaining to the stored bank becomes the moving phase, while those pertaining to the banks not selected become the still phases.

Here, the output of decoder 5 is applied to the clear terminal CLR of counter 4, so that the counter 4 is reset to the original state to recount the new values. As described above, after selecting a memory bank, if the next output of decoder 5 is applied to multiplexer 6, the multiplexer 6 selects the new memory bank pertaining to the output of the decoder 5 and stores the new data into the memory 9. When reducing the strobe timing, the third counter 7 down-counts the signal for varying the strobe timing to perform the above function. As when the strobe timing is constant, the frame phase moves sequentially in the order of position a→position b→position c→position d, thereby performing the strobe function.

In this way, the present invention enables the user to arbitrarily adjust the strobe timing in the VTR having the PIP feature, consequently raising the value of the VTR system by meeting the user's desire.

What is claimed is:

1. A circuit for controlling the strobe timing a picture-in-picture feature, comprising:
   a microcomputer;
   first, second and third counters receiving from said microcomputer a control signal for varying strobe timing;
   modulo-4 counter and logic means for receiving an output of said first counter;
   decoder means for receiving outputs of said second and third counters, and for providing an output to a clear terminal of said second counter;
   multiplexer for receiving the outputs of said decoder and said modulo-4 counter and logic means;
   register means for receiving the output of said multiplexer;
   a memory connected to be addressed with said output of said multiplexer via said register means; and
   means for applying vertical synchronizing pulses for sub-screens to a clock terminal of said first and second counters and a clock terminal of said register means, and an output of said microcomputer to a clock terminal of said third counter.

2. The circuit of claim 1, further comprised of said microcomputer generating said control signals to disable generation of said output of said first counter and to enable generation of said outputs of said second and third counters.

3. The circuit of claim 2, further comprised of said decoder means being coupled to reset said first counter to provide further said outputs of said second counter corresponding to counts of the vertical synchronizing pulses.

4. The circuit of claim 2, wherein:
   said first counter further comprises first means for counting said vertical synchronizing pulses during a first mode, and for generating a first level of pulses at fixed time intervals on the basis of said counting of vertical synchronizing pulses; and
   said modulo-4 counter and logic means sequentially generates said outputs corresponding to different ones of a plurality of sub-screens displayed upon the main video screen.

5. The strobe timing circuit of claim 2, wherein:
   said first counter further comprises first means for counting said vertical synchronizing pulses during a first mode, and for generating a first level of pulses at fixed time intervals on the basis of said counting of vertical synchronizing pulses;
   said modulo-4 counter and logic means sequentially generates a first counting signals as said output corresponding to different ones of a plurality of sub-screens displayed upon the main video screen;
   said second counter counts said vertical synchronizing pulses during a second mode, and generates second counting signals as said output in dependence upon the vertical synchronizing pulses; and
   said third counter counts said control signal during said second mode, and generates as said output third counting signals corresponding to changes in control of strobe timing for the subscreens.

6. The circuit of claim 1, further comprised of said microcomputer disenabling generation of said output of said first counter, enabling said outputs of said second and third counters, and applying to said first counter said control signals corresponding to changes in strobe control.

7. A strobe control circuit, comprising:
   control means for providing a control signal;
   counting means coupled to respond to said control signal, for providing in correspondence to a subscreen vertical synchronizing pulse train, a first counting signal, a second counting signal and a third counting signal; and
   decoding means for providing a clear signal to the counting means after providing a decoded signal by decoding said second and third counting signals.

8. The strobe timing circuit of claim 7, wherein said counting means comprises:
   first subcounting means for counting a number of pulses in said subscreen vertical synchronizing pulse train during a first operating mode, and for generating a strobe pulse train having a fixed time interval on the basis of said number of pulses; and
   means for sequentially generating said first counting signal corresponding to one of a plurality of subscreens displayed upon a video screen.

9. The strobe timing circuit of claim 7, wherein said counting means comprises:
   first subcounting means enabled during a first operating mode when a strobe pulse train has a fixed time interval, for generating the strobe pulse train at the fixed time interval in dependence upon the subscreen vertical synchronizing train;
   second subcounting means enabled during a second operating mode, for generating the second counting signal in dependence upon the subscreen vertical synchronizing pulse train; and
   third subcounting means enabled during the second operating mode, for generating the third counting signal in dependence upon the subscreen vertical synchronizing pulse train.

10. The strobe timing circuit of claim 9, wherein said clear signal is generated during the second operating mode to reset the second subcounting means.

11. A circuit for controlling a strobe timing of subscreens, comprising:
   first counting means for generating during a first mode, fixed time interval pulses and for generating first count values corresponding to positions of said subscreens displayed upon a main screen, in response to vertical synchronizing pulses of the subscreens;

means for generating memory addresses corresponding to said values;

memory means for storing said memory addresses in response to the vertical synchronizing pulses;

second counting means for generating during a second mode, second count values corresponding to the vertical synchronizing pulses;

third counting means for generating during said second mode, corresponding ones of a plurality of step signals in dependence upon control signals which indicate changes in said strobe timing of the subscreens; and decoder means for providing a decoded signal of said second count values and said step signals, to said means for generating addresses.

12. The circuit of claim 11, wherein said decoder means provides a clear signal to reset said second counting means.

13. The circuit of claim 11, further comprised of means for disabling said first counting means, and for enabling said second and third counting means.

14. The circuit of claim 13, wherein said first counting means comprises;

first means for counting said vertical synchronizing pulses and for generating said fixed time interval pulses by counting said vertical synchronizing pulses; and means for sequentially generating different ones of said first count values, with each of said first count values corresponding to a different one of said subscreens displayed upon the main screen.

15. The circuit of claim 14, wherein said sequentially generating means generates said different ones of said values in a fixed sequence.

16. The circuit of claim 11, wherein said first counting means comprises;

first means for counting said vertical synchronizing pulses and for generating said fixed time interval pulses by counting said vertical synchronizing pulses; and means for sequentially generating different ones of said first count values, with each of said first count values corresponding to a different one of said subscreens displayed upon the main screen.

17. The circuit of claim 16, wherein said sequentially generating means generates said different ones of said values in a fixed sequence.

18. A strobe timing circuit, comprising:

first counting means for generating during a first mode, fixed time interval pulses and for generating values corresponding to different positions of a subscreen displayed upon a main screen, in response to vertical synchronizing pulses of the subscreen;

means for generating memory addresses corresponding to said first count values;

memory means for storing said memory addresses corresponding to the vertical synchronizing pulses;

second counting means for generating during a second mode, counts of the vertical synchronizing pulses;

third counting means for generating during said second mode, corresponding ones of a plurality of step signals in dependence upon control signals which indicate changes in said strobe timing of the subscreens; and decoder means for providing a decoded signal of said second count values and said step signals, to said means for generating addresses.

19. The strobe timing circuit of claim 18, wherein said decoder means provides a clear signal to reset said second counting means.

20. The strobe timing circuit of claim 18, further comprised of means for disabling said first counting means, and for enabling said second and third counting means.

21. The strobe timing circuit of claim 18, wherein said first counting means comprises;

first means for counting said vertical synchronizing pulses and for generating said fixed time interval pulses by counting said vertical synchronizing pulses; and means for sequentially generating different ones of said first count values, with each of said first count values corresponding to a different one of said subscreens displayed upon the main screen.

22. The strobe timing circuit of claim 21, wherein said sequentially generating means generates said different ones of said values in a fixed sequence.

* * * * *